2,975,027
PREPARATION OF BOROHYDRIDES OF THE ALKALI METALS

Georg Wittig and Paul Hornberger, Tubingen, Germany, assignors to Heyl & Co. Chemischpharmazeutische Fabrik, Berlin-Steglitz, Germany No Drawing. Filed Aug. 3, 1954, Ser. No. 447,667
Claims priority, application Germany Feb. 3, 1951
3 Claims. (Cl. 23—14)

The invention relates to the preparation of the borohydrides of the alkali metals, and this application is a continuation-in-part of our copending application, Serial No. 268,124, filed January 24, 1952, now abandoned.

Lithium, sodium, and potassium borohydride are useful chemicals for the generation of hydrogen and diborane, and excellent reducing agents, which are particularly suitable for the selective reduction of polar double bonds.

Various methods have been proposed to obtain the alkali metal borohydrides. One group of methods consists in reacting diborane with an alkoxy borohydride or similar compounds of the respective alkali metal. Another method, which has been used particularly for the preparation of the sodium and potassium borohydride, uses the reaction of the respective alkali metal hydride with methyl borate. As far as these methods employ gaseous reactants as starting materials, they require the application of high temperatures and pressures.

A method of adding diborane directly to alkali metal hydrides in the presence of either has been suitable only for lithium hydride, because the low solvation tendency of Na+ and K+ and the low solubility of NaBH$_4$ and KBH$_4$ in ethers appeared to prevent such addition reaction.

Former investigators have also established that the reaction of lithium hydride and boron trifluoride leads to different reaction products, depending on the conditions of the reaction and the proportions of the reactants. If 6 moles of lithium hydride and 2 moles of boron trifluoride are suspended in ethyl ether and reacted, diborane is formed according to the equation (1) 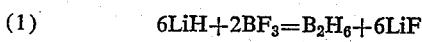6LiH+2BF$_3$=B$_2$H$_6$+6LiF If the same components are reacted under certain conditions in other proportions, the reaction (2) 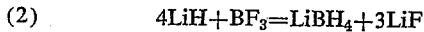4LiH+BF$_3$=LiBH$_4$+3LiF may be realized. The latter process was carried out under reflux in such a manner that first a small amount of the fluoride was added to the lithium hydride and the mixture was cooled to such an extent that the temperature was held in the range between 10 and 20° C. so that only limited amounts of diborane were liberated; subsequently more fluoride in ether was slowly added at a rate that the ether just barely simmered and only small amounts of diborane were developed. It will be seen that such a preparation of lithium borohydride according to Equation (2) required extended reaction periods and considerable skill on the part of the operator to avoid the formation of diborane according to Equation (1) and to obtain the desired end product. In addition, this method could not be applied to the preparation of sodium or potassium borohydride.

Said last recited method is based on vigorous cooling of the reactants and on an accurate control of the amount of boron fluoride, which is gradually presented to the mass of lithium hydride in the reaction zone; in other words, any development of diborane according to Equation (1) must be suppressed as much as possible. In contradistinction thereto, we have found that lithium borohydride can be obtained with a minimum of precautions and supervision in a very simple manner by reacting the total amounts of the reactants at elevated temperatures in a closed system, whereby substantial amounts of diborane are developed intermediately but completely converted into the borohydride. Our method provides not only a convenient method for the preparation of lithium borohydride but also of sodium and potassium borohydride.

In carrying out the method of the invention, a boron trihalide and a slight excess of an alkali metal hydride are brought together according to the reaction (3) 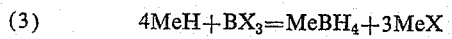4MeH+BX$_3$=MeBH$_4$+3MeX wherein Me is Li, Na, or K and X is F, Cl or Br, and subjected in an autoclave in the presence of an ether at least temporarily to a temperature in the range of about 100 to 140° C. We prefer to adjust the charge and the volume of the autoclave so that the pressures developed during the reaction do not substantially exceed 40 atm.; this pressure limit, however, is not critical and may be exceeded if the apparatus is of sufficiently strong material. The autoclave may be provided with an agitator, with means for supplying and withdrawing the reactants and the inert gas, and with the conventional means for heating and cooling. The reaction is carried out in the absence of moisture and oxygen, preferably in an atmosphere of nitrogen, and the rate of reaction depends on the starting temperature, the purity and size of the alkali metal hydride particles, and the kind of boron halide and ether used.

The general course of reaction proceeds in three distinct phases. The first phase, the mixing phase, takes generally 10 to 30 min. (induction period) and is characterized by the development of very small heats of reaction, which generally produce first a slight rise and subsequently a slight decline of the temperature. At the end of this phase, a violent but very short exothermic reaction, accompanied by the generation of pressure, is observed, which reaction takes place spontaneously in the case of lithium hydride, and after supply of external heat in the case of sodium and potassium hydride. This second phase is then followed by an endothermic reaction phase 3, accompanied by a pressure decrease. This last phase is generally completed within one hour, and a supply of heat in this phase is only required to react the last residues of the diborane developed in the second phase; this is generally necessary only in reactions involving sodium or potassium hydride, but rarely in the case of lithium hydride. After cooling to room temperature, the pressure has substantially decreased to atmospheric pressure, and the autoclave may be opened for processing the reaction mixture in the conventional manner. Snowwhite end products are recovered of a purity of over 95% and in a yield of 80 to 100%, based on the boron halide.

The boron halide may be applied as such dissolved in an ether or it may be first combined with an ether to the etherate and said etherate may be dissolved in ether. Such etherates are complex compounds of one mole of boron halide with one mole of ether; the boron fluoride diethyletherate is represented, for instance, by the formula $BF_3:O(C_2H_5)_2$. Instead of the diethyl ether, other ethers such as dipropyl ether, tetrahydrofurane, and the like may be used.

The invention will be better understood with reference to the following examples, which are given by way of illustration and are not intended to limit the scope of the invention in any way.

*Example 1*

This example is given for the preparation of lithium borohydride in very small amounts under laboratory conditions.

5 g. (0.63 mole) of finely divided lithium hydride and about 5 cc. of anhydrous diethyl ether are cooled in a combustion tube to −78° C., and to this mixture a mixture, also cooled to −78° C., of 7.1 g. (0.05 mole) of boron trifluoride-diethyletherate $(BF_3:O(C_2H_5)_2)$ of B.P. 49–50° C./15 mm. and 5 cc. of anhydrous diethyl ether was added. The closed tube, the contents of which were vigorously mixed by shaking, was treated for 24 hours at 125° C. After cooling, only a slight overpressure was observed on opening the tube. A small amount of anhydrous ether was added to the obtained product, which was then filtered by suction under exclusion of moisture; the residue was washed twice with anhydrous ether, which was combined with the filtrate. The obtained solution was concentrated by distillation in vacuo and precipitated, on cooling, lithium borohydride etherate in colorless needles.

Yield: 4 g. $LiBH_4:O(C_2H_5)_2$ (=83% of theory, based on $BF_3$), after the product was dried in vacuo at 20° C. The crystal ether may be removed by drying in vacuo on the water bath.

*Example 2*

40 g. (4.75 moles) of powdered lithium hydride (95%) were placed in an autoclave of 2.5 liter volume and covered with 150 cc. of anhydrous diethyl ether at room temperature. As autoclave, any autoclave of the agitator, shaking, or rolling type may be used. Subsequently, the autoclave was closed, evacuated by means of a waterjet pump, and then a solution of 142 g. (1 mole) of boron trifluoride diethyletherate $(BF_3:O_2(C_2H_5)_2)$ in 150 cc. of anhydrous ether was pressed into the autoclave by means of nitrogen. The contents of the autoclave were then immediately stirred, shaken or rolled to obtain a thorough mixture. After an induction period of about 30 min. the temperature of the mixture, which originally was about 10° C., rose to 90° C. and the pressure in the autoclave rose to about 25 atm. in excess of atmospheric pressure. This temperature remained constant for a period of some minutes, while the pressure fell within the same period over 10 atm. to 5 atm. in excess of atmospheric pressure. Subsequently, also the temperature began to fall together with the pressure. After additional 30 minutes, the temperature was 30° C. and the pressure about 2 atm. in excess of atmospheric pressure. As a withdrawn sample of the gas still burned with the characteristic green boron flame, the autoclave was heated. After about 30 min. the temperature had reached again 114° C. and the pressure had risen to 10 atm. over atmospheric pressure. Said temperature was maintained for additional 30 minutes, whereby the pressure fell by one atmosphere. A gas sample now withdrawn did not show the boron flame. The autoclave was then cooled to room temperature, and opened when the overpressure had subsided. The obtained product was processed in the usual way and yielded 19.8 g. of $LiBH_4$, i.e. 90% of the theoretical yield, based on the amount of boron trifluoride.

*Example 3*

The reaction described in the preceding example was repeated but the diethyl ether was replaced by anhydrous tetrahydrofurane, and instead of 1 mole of boron trifluoride-diethyletherate, 1 mole (140 g.) of boron trifluoride-tetrahydrofuranate, $BF_3:O(C_4H_8)$, B.P. 92–94° C./15 mm., was used. The course of reaction was substantially the same but no external heat supply was required because at the end of the spontaneous reaction no overpressure was observed at 30° C. and the flame test of gas samples did no longer show the boron flame.

Yield: 20 g. of $LiBH_4$, i.e. 91% of the theoretical yield, based on $BF_3$.

*Example 4*

82 g. (2.73 moles) of powdered NaH (80%), 200 cc. of anhydrous diethyl ether, and a solution of 34 g. (0.5 mole) of $BF_3$ in 140 cc. of anhydrous diethyl ether were placed at room temperature in an autoclave and reacted as set forth in Example 2. The starting temperature of 20° C. rose to 38° C. and fell then again to 32° C. Only slight pressure obtained in the autoclave, and a gas sample distinctly displayed the boron flame. The autoclave was heated so as to obtain after a period of about 30 min. an inside temperature of 80° C. and a pressure of 5 atm. in excess of atmospheric pressure. The heating was continued until the temperature was 118° C. and the pressure 11 atm. over the ambient atmosphere; said temperature was maintained for a period of 8 hours, during which time the pressure fell to 8 atm. At the end of this period, gas taken from the autoclave did no longer show the boron flame. The autoclave was allowed to cool down and the diethyl ether was removed by opening the exhaust valve. The dry white residue was extracted with anhydrous iso-propylamine or n-butylamine. The extract was heated in vacuo to evaporate the amine, and ether was added to precipitate sodium borohydride; the latter was filtered off, washed with ether and dried under reduced pressure on the water bath.

Yield: 19 g. of $NaBH_4$, i.e. 100% of the theoretical, based on the amount of boron fluoride.

*Example 5*

If in Example 4 the boron trifluoride was replaced by 0.5 mole of $BCl_3$, the reaction proceeded substantially in the same way, and the yield was 15.2 g. of $NaBH_4$, i.e. 80% of the theoretical, based on the amount of $BCl_3$.

*Example 6*

75 g. (1.5 moles) of finely divided KH (80%) suspended in 200 cc. of anhydrous diethyl ether, and 35.5 g. (0.25 mole) of boron trifluoride-diethyl etherate dissolved in 50 cc. of diethyl ether, were reacted as described in Example 4. The yield was 10.8 g. of $KBH_4$=80% of the theoretical, based on $BF_3$.

It will be understood that modifications and variations of the above described details of the invention may be made without departing from the scope of the appended claims.

We claim:

1. A method of preparing lithium borohydride comprising combining in an autoclave a suspension of lithium hydride in an anhydrous ether and boron fluoride dissolved in an anhydrous ether to a mixture containing at least 4 moles of lithium hydride for each mole of boron fluoride, confining said mixture in said autoclave, allowing said lithium hydride and boron fluoride to react spontaneously within said mixture, retaining the heat developed by said reaction within said reaction mixture, heating said mixture by said developed heat to a temperature of about 90 to 140° C., subsequently supplying heat to complete the reaction at a temperature of about 100 to 140° C., and finally recovering lithium borohydride from the reaction mixture.

2. The method defined in claim 1 wherein said boron fluoride is employed in the form of its etherate.

3. The method defined in claim 1 wherein said ether is diethyl ether.

References Cited in the file of this patent

UNITED STATES PATENTS 2,532,217    Winternitz    Nov. 28, 1950
2,658,816    Boldebuck et al.    Nov. 10, 1953

OTHER REFERENCES

Wittig et al.: "Zeitschrift fur Naturforschung," vol. 6b, p. 225 (1951).

Ephraim: "Inorganic Chemistry," Thorne and Roberts, 4th ed., pp. 877, 878 (1943).

Elliot et al.: "Journal of the American Chemical Society," vol. 74, pp. 5047–5052 (Oct. 20, 1952).